Aug. 23, 1932.   W. F. FRASER   1,873,752
GRINDING MACHINE
Filed Oct. 2, 1930   3 Sheets-Sheet 1
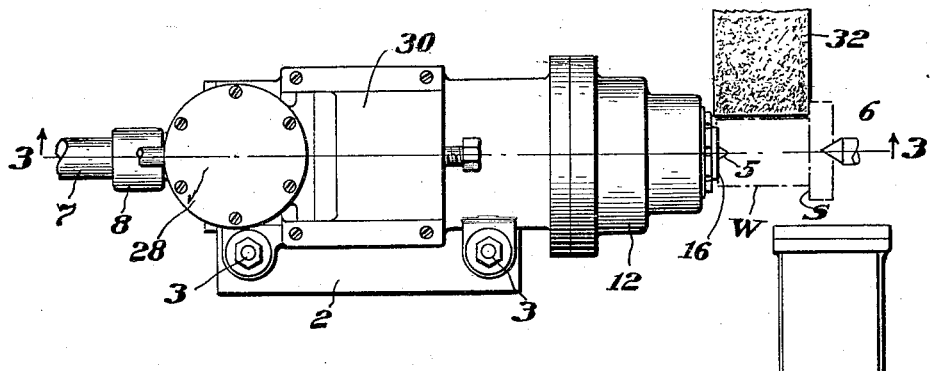
Fig.1.
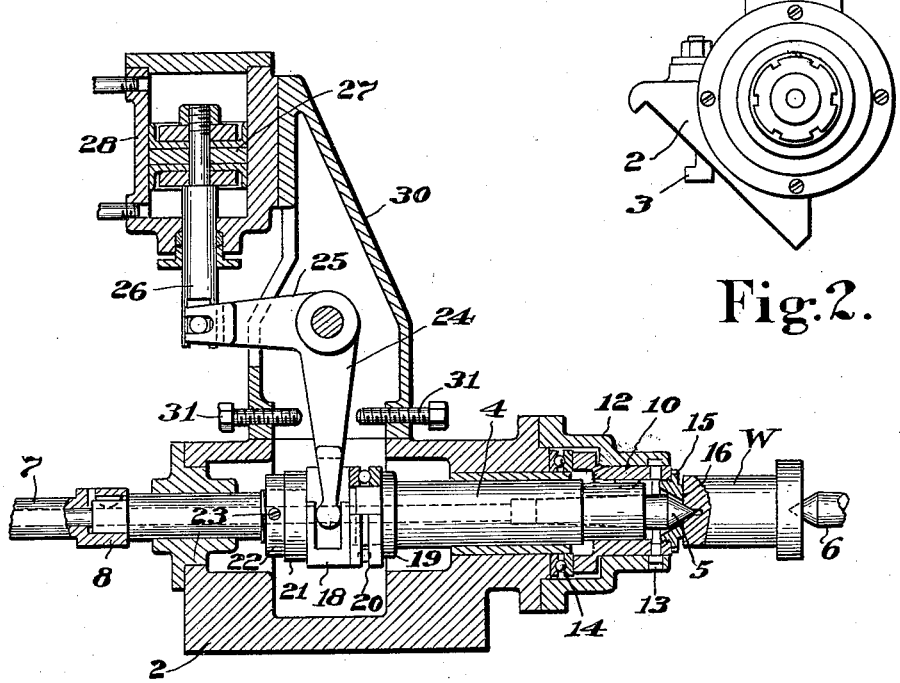
Fig.2.
Fig.3.
INVENTOR
Warren F. Fraser,
BY
J. H. McCurdy,
ATTORNEY Aug. 23, 1932.　　　W. F. FRASER　　　1,873,752
GRINDING MACHINE
Filed Oct. 2, 1930　　　3 Sheets-Sheet 2
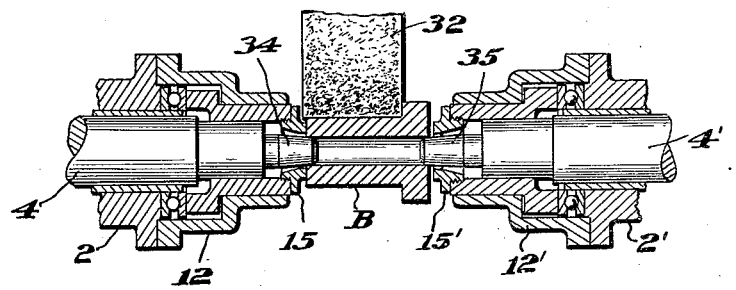
Fig.4.
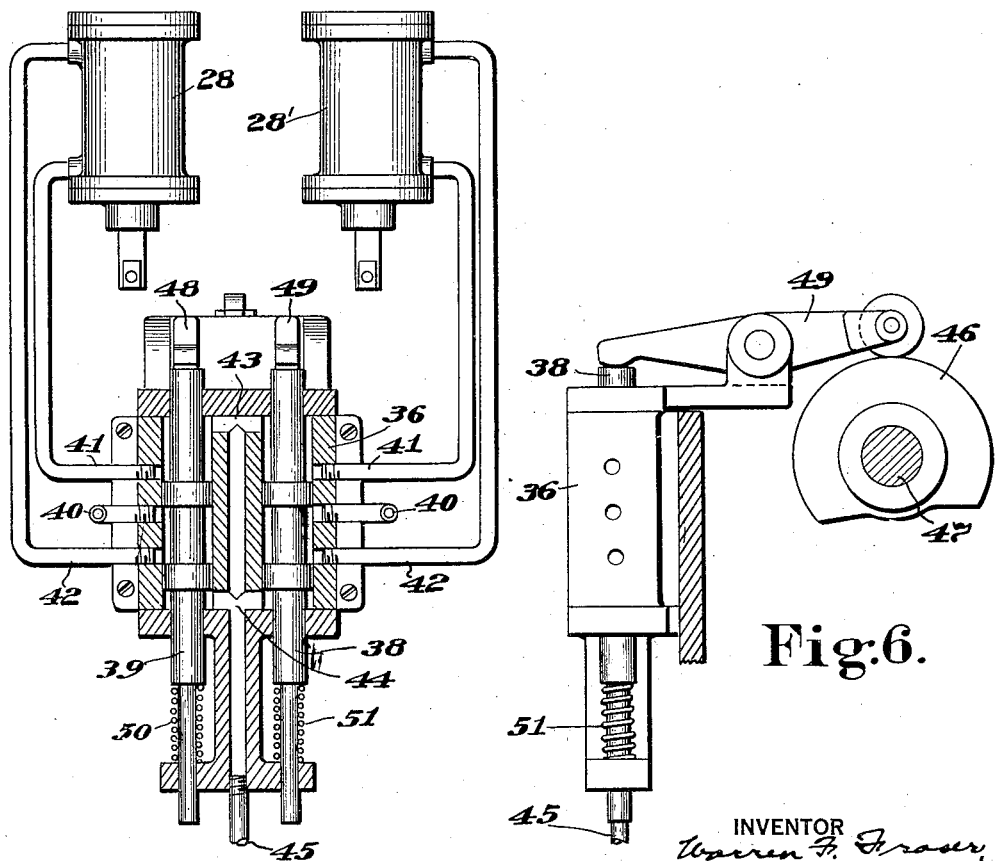
Fig.5.
Fig.6.
INVENTOR
Warren F. Fraser,
BY
ATTORNEY Aug. 23, 1932.   W. F. FRASER   1,873,752
GRINDING MACHINE
Filed Oct. 2, 1930   3 Sheets-Sheet 3
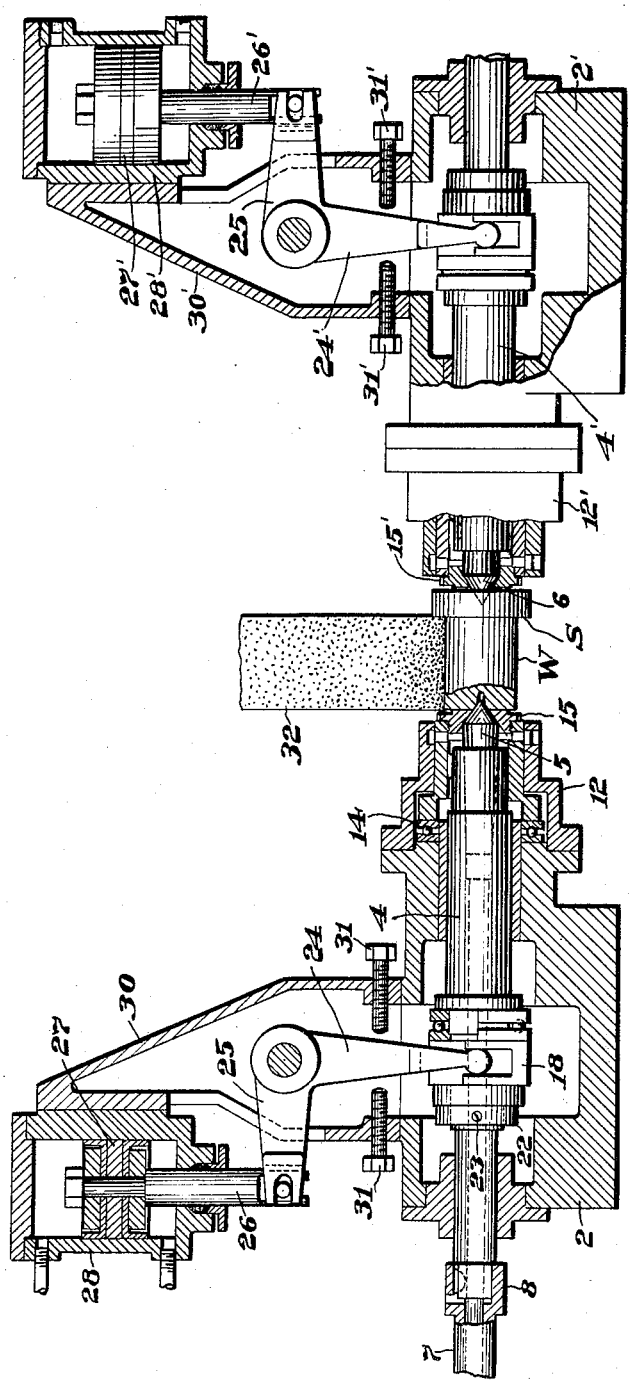
Fig.7

Patented Aug. 23, 1932

1,873,752

UNITED STATES PATENT OFFICE

WARREN F. FRASER, OF WESTBORO, MASSACHUSETTS

GRINDING MACHINE

Application filed October 2, 1930. Serial No. 485,963.

This invention relates to grinding machines and is more especially concerned with the means for supporting and positioning the articles of work for the grinding operation.

The invention will be herein disclosed as applied to the machine shown in my prior Patent No. 1,736,967, granted November 26, 1929. This machine is designed particularly to grind bushings, pins, rolls, and other articles having cylindrical or tapered external surfaces, and it is so organized as to perform all of the grinding operations and those of mounting and releasing the work automatically.

It is the chief object of the invention further to improve and perfect the work supporting and positioning mechanisms of machines of this general type with a view to enabling them to handle a wider variety of work while still performing their various functions automatically. The invention is directed particularly to the provision of mechanism for handling shouldered work such, for example, as shouldered bushings, and for supporting and positioning such articles of work automatically for the grinding of either the cylindrical or shouldered surfaces, or both, to a high degree of accuracy.

The nature of the invention will be readily understood from the following description when read in connection with the accompanying drawings, and the novel features will be particularly pointed out in the appended claims.

In the drawings,

Figure 1 is a plan view of a work head embodying features of this invention and showing it in operative relationship to the tail stock center and the grinding wheel;

Fig. 2 is an end elevation of the work head shown in Fig. 1;

Fig. 3 is a vertical sectional view on the line 3—3, Fig. 1, of the work head shown in Fig. 1;

Fig. 4 is a horizontal sectional view of a modified form of work holding and positioning devices;

Fig. 5 is a diagrammatic view showing a valve mechanism which may be used to control the operation of the work head shown in Fig. 1;

Fig. 6 is a side view of the valve arrangement shown in Fig. 5 illustrating the cam mechanism which controls its operation; and Fig. 7 is a vertical sectional view illustrating another embodiment of the invention.

The drawings show certain parts only of the machine illustrated in my prior patent above designated, and reference should be made to the specification and drawings of said patent for a complete understanding of the machine.

Referring first to Figs. 1, 2 and 3 the work head there shown is designed to be mounted in the machine shown in my patent aforesaid in place of the work head 69 illustrated in Fig. 10 of said patent. The new work head comprises a body or frame 2 which may be secured to the base of the machine by bolts 3—3. It also includes a head stock which comprises a spindle 4 journaled in suitable bearings supported in the frame 2 so that it can have both a rotary motion and also an axial movement. This spindle carries a work centering member 5 designed to cooperate with a similar centering member 6 of the tail stock to support the work W for the grinding operation. The tail stock center 6 corresponds to the part 74, Fig. 2, of my patent aforesaid, and it may be supported in the manner disclosed in said patent or by an arrangement like that shown in Fig. 7, or by any other convenient mechanism.

In order to rotate the spindle 4 it is connected with a shaft 7 of the machine by a collar 8 which is slidably keyed to the reduced end of the spindle in the same manner that the shaft 103 of said patent is connected to the spindle 71 of the machine there shown.

The head stock also includes a sleeve 10 which is keyed to the forward or right-hand end, Fig. 3, of the spindle 4 by a slidable connection so that the sleeve and spindle are compelled to rotate in unison, but the spindle can slide relatively to the sleeve. A housing 12 which is secured to the body or frame 2 encloses the sleeve 10 and prevents any substantial movement of the sleeve toward the right, Fig. 3. This housing is also provided with a groove cooperating with vent holes in the sleeve 10 and with a hole 13 at the bottom of the housing to permit the escape of coolant used in the grinding operation. A ball thrust bearing 14 backs up the sleeve and prevents it from moving toward the left since it is itself backed up by the frame piece 2. The sleeve also is provided with a removable bushing 15 threaded into the end thereof and having an end face 16 which is adapted to engage with the end face of the work W and thereby determine the endwise position of the work, this bushing being supported in a fixed position by the parts just mentioned.

For the purpose of relatively moving the work supporting and centering members 5 and 6 to engage or release the work, a collar 18 is secured rotatably on the spindle 4 and is held against axial movement in one direction by a shoulder 19 formed on the spindle and a ball thrust bearing 20 interposed between the collar 18 and the shoulder. Any substantial axial movement in the opposite direction is prevented by a collar 21 which is backed up by another collar 22 screw threaded on the spindle 4 and secured in an adjusted position by a set screw 23. The forked lower end of a bell crank lever 24 straddles the collar 18 and enters slots provided to receive it in the opposite sides of the collar. This lever also has a horizontal arm 25 which is operatively connected with the lower end of a piston rod 26 having a piston 27 secured to its upper end. The piston works in a short vertical cylinder 28 which is secured to the frame piece 2 by a bracket 30, the bracket also serving as a bearing and housing for the bell crank lever 24—25. Stop screws 31—31 threaded through the opposite walls of the bracket are positioned to engage the opposite sides of the lever arm 24 and to limit the range movement of this lever.

By controlling the supply and discharge of fluid under pressure to and from the cylinder 28 the spindle 4 can be made to advance into contact with the work or to recede therefrom at any desired points in the cycle of operations of the machine. If the tail stock center 6 is positively moved by a cam mechanism as shown in Patent No. 1,736,967 the pressure exerted by it on the work will be sufficient to overcome the opposing pressure applied through the head stock center 5, and the end of the work will be held in contact with the face 16 of the work positioning bushing 15. The position of the work longitudinally of the axis on which it revolves, therefore, will be accurately determined and when the grinding wheel 32 is advanced to face off the shoulder S on the work, or to grind the cylindrical surface of the work, or to perform both functions, it will grind the shoulder to a definite and accurate relationship to the end of the work which is abutted against the bushing 15.

Under some circumstances it is preferable to replace not only the head stock mechanism 69 of the machine shown in Patent No. 1,736,- 967 with the work head above described, but also to replace the tail stock mechanism with a similar arrangement. This is conveniently accomplished as shown in Fig. 7 by mounting the tail stock center 6 in a mechanism substantially like that shown in Figs. 1, 2 and 3. This mechanism comprises a spindle 4' in which the tail stock center 6 is supported, the spindle being mounted in the body 2' in essentially the same manner that the spindle 4 is supported in the body 2. Other parts are associated with the spindle to rotate it and reciprocate it axially in substantially the same manner that the spindle 4 is operated and these parts are indicated by corresponding but primed numerals.

The differential pressure which the work supporting and centering members 5 and 6 exert upon the work W may be produced either by using a higher pressure in the cylinder 28' than in the cylinder 28, or by making the cylinder 28' and the piston 27' which works in it of somewhat larger diameter than the corresponding parts 27 and 28 and using the same pressure in both cylinders. The latter method usually is preferable because it requires only one supply of fluid under pressure and accordingly this construction has been illustrated in Fig. 7. Due to this differential in pressure, the left-hand end of the work W will always be held against the work positioning member 15 while the grinding operation is being performed.

As each piece of work, therefore, is delivered automatically to the centers 5 and 6, they will advance to engage the opposite ends of the piece, center it, and move it endwise until it abuts against the bushing 15, holding it in this position until the grinding operation has been performed and then withdrawing and allowing it to drop out of grinding position.

If the work consists of a bushing or other article which must be centered by its bore, it is preferable to replace the work centering and supporting members 5 and 6 with other centering members such as those indicated at 34 and 35, Fig. 4, the latter members having a slow taper to enter the opposite ends of the bore in the bushing B and form a supporting and driving connection therewith. In this construction also a differential pressure is applied through the spindles 4 and 4' to the work, the greater pressure being exerted through the spindle 4' and its centering device 35 to force the work against the positioning member 15. In this arrangement the bushing 15 acts not only as an end positioning device but also as a stripper to remove the work from the part 34 as the latter withdraws after the completion of the grinding operation. A similar bushing 15′ is associated with the work supporting member 35.

Each of these members projects through an aperture in its respective bushing and as the members withdraw to release the work the bushing B, which will tend to stick to one or the other of them, is stripped off by its contact with one of the parts 15 or 15′.

A valve mechanism suitable for controlling the operation of the pistons 27 and 27′ is shown in Figs. 5 and 6. It comprises a valve cylinder 36 having two bores to receive slidable valves 37 and 38, respectively. Fluid under pressure is delivered to the cylinders through pipes or tubes 40—40. Additional pipes or tubes 41—41 connect the valve cylinder with the lower ends of the cylinders 28 and 28′, while similar pipes 42—42 connect the upper ends of said cylinders with the valve cylinder. The communication between these tubes and the supply pipes, or between the tubes and the exhaust ports 43 and 44 are controlled by the valves 37 and 38 in a manner which will be obvious to those skilled in this art. The exhaust ports both communicate constantly wth the exhaust or outlet pipe 45.

The operation of the two valves 37 and 38 is controlled by a cam 46, Fig. 6, on the cam shaft 47 of the machine, this shaft corresponding to the shaft 49 of the machine shown in my prior patent above designated. The cam acts through two rocker arms 48 and 49, respectively, which bear upon the upper ends of the respective valves 37 and 38. Springs 50 and 51 coiled about the shanks of the respective valves hold them upwardly against their rocker arms and force the rolls carried by the respective rocker arms against the surface of the cam 46. In the particular position shown in Fig. 5, fluid under pressure may flow from the supply pipes 40—40 through the pipes 42—42 to the upper ends of the cylinders 28 and 28′, thus forcing the pistons in these cylinders downwardly and holding the work centering devices 5 and 6 in their projected or work supporting positions. This is the normal condition during the grinding operation. When the cam 46 allows the springs 50 and 51 to force the valves 37 and 38 upwardly, the fluid above the pistons in the cylinders 28 and 28′ will be released and allowed to exhaust while fluid under pressure will be forced into the lower ends of the cylinders, thus lifting the pistons and causing both of the work centering devices 5 and 6 to recede and to release the work.

The invention thus enables a grinding machine of the general type shown in my earlier patent to handle and grind shouldered work automatically and with a high degree of accuracy. It is also contemplated that the invention may be used in machines of other types.

While I have herein shown and described a preferred embodiment of my invention it will be understood that the invention may be embodied in other forms without departing from the spirit or scope thereof.

Having thus described my invention, what I desire to claim as new is:

1. In a grinding machine, the combination of a head stock, a tail stock cooperating with said head stock to support the work for rotation about an axis, each of said stocks having a rotary work supporting member and one of them having an additional work positioning member provided with a face against which to abut the work to hold the work in a fixed position endwise of said axis, automatic mechanism for relatively moving said supporting members to engage and release opposite ends of the work and to force said work against said face and hold it there against the pressure oppositely exerted thereon, and means for grinding the work so positioned.

2. In a grinding machine, the combination of a head stock, a tail stock cooperating with said head stock to support the work for rotation about an axis, each of said stocks having a rotary work supporting member and one of them having an additional work positioning member provided with a face against which to abut the work to hold the work in a fixed position endwise of said axis, fluid pressure operated mechanism for relatively moving said supporting members to engage and release opposite ends of the work, means for forcing the work endwise against said face and holding it there against the pressure oppositely exerted on the work, and means for grinding the work so positioned.

3. A grinding machine as defined in preceding claim 2 in which said fluid pressure operating mechanism includes valve means for controlling the operation of said mechanism; a cam, and means under the control of said cam for operating said valve mechanism.

4. In a grinding machine, the combination of a head stock, a tail stock cooperating with said head stock to support the work for rotation about an axis, each of said stocks having a rotary work supporting member and one of them having an additional work positioning member provided with a face against which to abut the work to hold the work in a fixed position endwise of said axis, fluid pressure operated mechanism for moving both of said work supporting members into and out of operative engagement with opposite ends of the work, said mechanism being constructed and arranged to apply greater pressure to the work through one of said supporting members than through the other and thereby to hold the work abutted against said face, and means for grinding the work so positioned.

5. In a grinding machine, the combination of a head stock, a tail stock cooperating with said head stock to support the work for rotation about an axis, each of said stocks having a rotary work supporting member and one of them having an additional work positioning member provided with a face against which to abut the work to hold the work in a fixed position endwise of said axis, fluid pressure operated mechanism for moving both of said work supporting members into and out of operative engagement with opposite ends of the work, valve mechanism controlling the operation of said fluid pressure mechanism, a cam shaft, and means arranged to be operated by said cam shaft for actuating said valve mechanism.

6. In a grinding machine, the combination of a grinding wheel, a head stock, a tail stock, each of said stocks having a work supporting member, a work positioning member independent of said work supporting members but associated with one of said stocks and having a face against which to abut the work, said positioning member having an aperture through which the work supporting member associated with it may be projected into engagement with the work, means including a thrust bearing for supporting said work positioning member against the thrust of the work and in a fixed position and automatic mechanism for relatively moving said work supporting members into and out of engagement with the work and for holding the work against said face while the grinding operation is being performed.

7. In a grinding machine, the combination of a head stock, a tail stock, said stocks having work centering members to engage opposite ends of the work and support it for the grinding operation, automatic mechanism for relatively moving said centering members to engage or release the work, a work positioning member independent of said work centering members but associated with one of said stocks for abutting against an end face of the work, means including a thrust bearing for supporting said work positioning member against the thrust of the work and in a fixed position, said mechanism being constructed and arranged to operate through one of said centering members to force the work against said positioning member and to hold it thereagainst during the grinding operation, and means for grinding the work so positioned.

WARREN F. FRASER.